(12) United States Patent
Isaji et al.

(10) Patent No.: US 8,103,424 B2
(45) Date of Patent: Jan. 24, 2012

(54) INTER-VEHICLE DISTANCE CONTROL APPARATUS AND METHOD FOR CONTROLLING INTER-VEHICLE DISTANCE

(75) Inventors: Kazuyoshi Isaji, Kariya (JP); Naohiko Tsuru, Handa (JP)

(73) Assignee: Denso Corporation, Kariya (JP)

(*) Notice: Subject to any disclaimer, the term of this patent is extended or adjusted under 35 U.S.C. 154(b) by 926 days.

(21) Appl. No.: 12/151,998

(22) Filed: May 12, 2008

(65) Prior Publication Data

US 2008/0288152 A1 Nov. 20, 2008

(30) Foreign Application Priority Data

May 14, 2007 (JP) .................. 2007-128568

(51) Int. Cl.
*B60T 7/12* (2006.01)
*G05D 1/00* (2006.01)
*G05D 1/02* (2006.01)
*G08G 1/16* (2006.01)

(52) U.S. Cl. .............. 701/96; 701/94; 701/79; 701/301; 701/300

(58) Field of Classification Search .................. None
See application file for complete search history.

(56) References Cited

U.S. PATENT DOCUMENTS

| | | | | |
|---|---|---|---|---|
| 5,761,630 A * | 6/1998 | Sekine et al. | ............. | 701/301 |
| 6,185,499 B1 * | 2/2001 | Kinoshita et al. | ............. | 701/96 |
| 6,269,308 B1 * | 7/2001 | Kodaka et al. | ............. | 701/301 |
| 6,345,227 B1 * | 2/2002 | Egawa et al. | ............. | 701/96 |
| 6,370,470 B1 * | 4/2002 | Yamamura et al. | ............. | 701/96 |
| 2007/0021876 A1 * | 1/2007 | Isaji et al. | ............. | 701/1 |

FOREIGN PATENT DOCUMENTS

| | | |
|---|---|---|
| JP | 5-24524 | 2/1993 |
| JP | 06-040270 | 2/1994 |
| JP | 10-67301 | 3/1998 |
| JP | 11-334557 | 12/1999 |
| JP | 2003-118422 | 4/2003 |
| JP | 2007-050755 | 3/2007 |
| JP | 2007-76632 | 3/2007 |
| JP | 2007-076632 | 3/2007 |

OTHER PUBLICATIONS

Office action dated Dec. 9, 2008 in Japanese Application No. 2007-128568.
Office action dated Aug. 17, 2010 in corresponding Japanese Application No. 2007-128568.
Office action dated Nov. 2, 2010 in corresponding Japanese Application No. 2007-128568.

* cited by examiner

*Primary Examiner* — Khoi Tran
*Assistant Examiner* — Bao Long T Nguyen
(74) *Attorney, Agent, or Firm* — Harness, Dickey & Pierce, PLC

(57) ABSTRACT

An inter-vehicle distance control apparatus is provided to provide comfortable acceleration feeling to a driver of a vehicle in various situations. The inter-vehicle distance control apparatus is configured to perform an acceleration control operation when a correction distance condition evaluation index at a present time, which takes into account a velocity of a forward object, is smaller than a threshold given by a judgment equation. The inter-vehicle distance control apparatus is configured to perform the acceleration control operation to accelerate the vehicle at a target acceleration, which is calculated from an actual relative velocity and a target relative velocity corresponding to the threshold given by the judgment equation.

3 Claims, 3 Drawing Sheets

| (I) | | SET SPEED=100km/h |
| --- | --- | --- |
| | Vp=80km/h | Vs0=100km/h |
| (II) | | |
| | Vp=80km/h | Vs0=100→80km/h |
| (III) | | |
| | Vp=80km/h | Vs0=80km/h |
| (IV) | | |
| | Vp=80→100km/h | Vs0=80→100km/h |
| (V) | | |
| | Vp=100km/h | Vs0=100km/h |

INTER-VEHICLE DISTANCE CONTROL APPARATUS AND METHOD FOR CONTROLLING INTER-VEHICLE DISTANCE

CROSS REFERENCE TO RELATED APPLICATION

The present application is based on Japanese Patent Application No. 2007-128568 filed on May 14, 2007, the disclosure of which is incorporated herein by reference.

FIELD OF THE INVENTION

The present invention relates to an inter-vehicle distance control apparatus and a method for controlling an inter-vehicle distance.

BACKGROUND OF THE INVENTION

An inter-vehicle distance control apparatus has been proposed in, for example, Japanese Patent No. 2567548. The inter-vehicle distance control apparatus controls a speed of a subject vehicle based on a relative-velocity between the subject vehicle and a preceding vehicle to maintain an inter-vehicle distance between the subject and preceding vehicles at a target inter-vehicle distance. According to the inter-vehicle distance control apparatus, when the speed of the subject vehicle is fast and when the inter-vehicle distance is small, a time constant associated with a filter for outputting a relative-velocity is decreased. When the speed of the subject vehicle is slow and when the inter-vehicle distance is large, the time constant associated with a filter for outputting the relative-velocity is increased. The above manners may improve a capability of controlling the inter-vehicle distance in respects of response and stability.

However, since conventional inter-vehicle distance control apparatuses control a speed of a subject vehicle based on a relative-velocity between the subject vehicle and a preceding vehicle to maintain an inter-vehicle distance at a target inter-vehicle distance, a resultant acceleration may provide uncomfortable acceleration feeling to a driver of the subject vehicle.

SUMMARY OF THE INVENTION

In view of the above-described problem, it is an object of the present invention to provide an inter-vehicle distance control apparatus and a method for controlling an inter-vehicle distance.

According to a first aspect of the present invention, an inter-vehicle distance control apparatus is provided. The inter-vehicle distance control apparatus includes: a distance detection unit configured to detect a distance between a subject vehicle and a forward object existing forward of the subject vehicle; a relative velocity detection unit configured to detect a relative velocity of the subject vehicle with respect to the forward object; and an evaluation index calculation unit configured to calculate a correction distance condition evaluation index representing a distance condition between the subject vehicle and the forward object. The distance condition takes into account a velocity of the forward object. The correction distance condition evaluation index becomes larger as the relative speed of the subject vehicle with respect to the forward object is larger. A rate of an increase in the correction distance condition evaluation index with respect to the distance between the subject vehicle and the forward object becomes larger with decreasing distance between the subject vehicle and the forward object. The inter-vehicle distance control apparatus further includes: an index comparison unit configured to determine whether the correction distance condition evaluation index reaches a predetermined threshold of the correction distance condition evaluation index; and an assist control unit configured to perform an acceleration control operation to accelerate the subject vehicle when the index comparison unit determines that the correction distance condition evaluation index reaches the predetermined threshold of the correction distance condition evaluation index.

According to the above inter-vehicle distance control apparatus, the acceleration control operation is performed when the correction distance condition evaluation index is smaller than the predetermined threshold of the correction distance condition evaluation index. It is possible to provide comfortable feeling to a driver of the subject vehicle.

According to a second aspect of the present invention, an inter-vehicle distance control apparatus includes: a distance detection unit configured to detect a distance between a subject vehicle and a forward object existing forward of the subject vehicle; a relative velocity detection unit configured to detect a relative velocity of the subject vehicle with respect to the forward object; a condition determination unit configured to make a determination whether a condition for performing an acceleration control operation is satisfied. The determination is made based on a distance condition between the subject vehicle and the forward object. The distance condition between the subject vehicle and the forward object includes information on the distance between the subject vehicle and the forward object, the relative velocity between the subject vehicle and the forward object, a velocity of the forward object. The inter-vehicle control apparatus further comprises: an assist control unit configured to perform the acceleration control operation to accelerate the subject vehicle when the condition determination unit determines that the condition for performing the acceleration control operation is satisfied.

According to the above inter-vehicle distance control apparatus, the acceleration control operation is performed when the condition for performing the acceleration control operation is satisfied. It is possible to provide comfortable feeling to a driver of the subject vehicle.

According to a third aspect of the present invention, a method for controlling an inter-vehicle distance control apparatus includes: detecting a distance between a subject vehicle and a forward object existing forward of the subject vehicle; detecting a relative velocity of the subject vehicle with respect to the forward object; making a determination whether a condition for performing an acceleration control operation is satisfied, wherein the determination is made based on a distance condition between the subject vehicle and the forward object, and the distance condition includes information on the distance between the subject vehicle and the forward object, the relative velocity between the subject vehicle and the forward object, a velocity of the forward object; and performing the acceleration control operation to accelerate the subject vehicle when it is determined that the condition for performing the acceleration control operation is satisfied.

According to the above method for controlling inter-vehicle distance, the acceleration control operation is performed when the condition for performing the acceleration control operation is satisfied. It is possible to provide comfortable feeling to a driver of the subject vehicle.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

A drive assistance system has been disclosed in Japanese Unexamined Patent Application Publication Number 2007-076632, corresponding to US Patent Application Publication No. 2007-0021876, by the inventors of the present invention. According to the drive assistance system, a target driver condition coefficient is provided based on a condition of a skilled or experienced driver of a vehicle so that an inter-vehicle distance between the vehicle and a preceding vehicle is maintained at a constant distance. A target relative acceleration deceleration is calculated based on the target driver condition coefficient and a present driver condition coefficient.

According to the above drive assistance system, however, since a target acceleration $K_{dBaa}$ is calculated based on an inter-vehicle distance D and a relative velocity $V_r$ only, it is not always possible to provide comfortable acceleration feeling to a driver of the subject vehicle.

(Example Embodiment)

Figure 1:
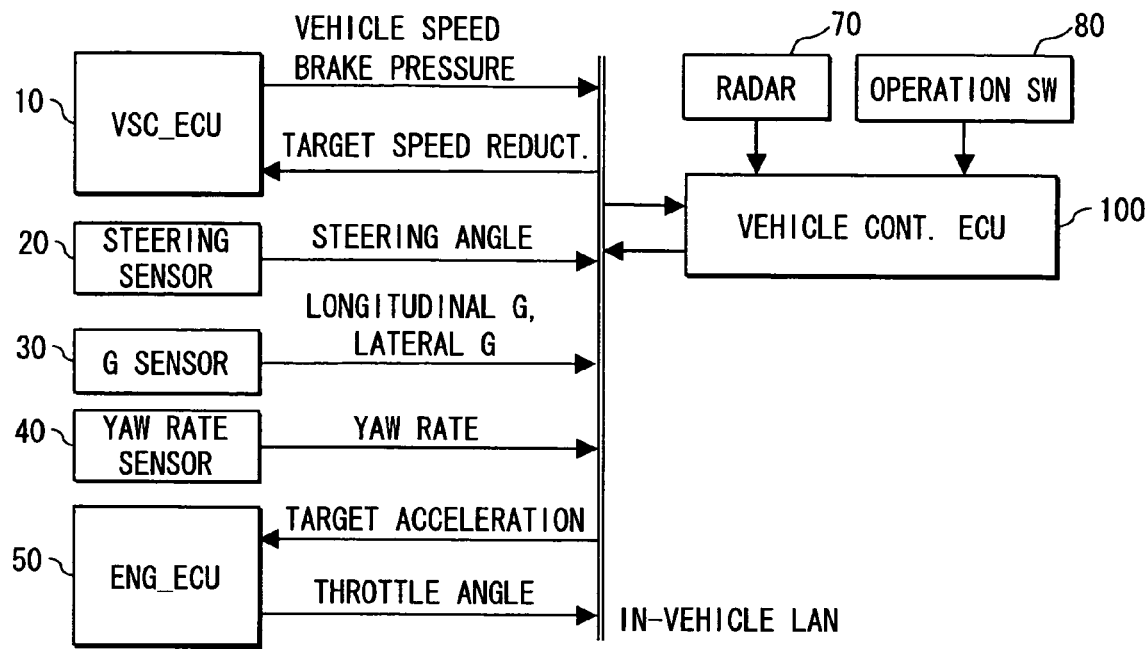
FIG. 1 is a block diagram of a driving assist system.

An inter-vehicle distance control apparatus according to an example embodiment is applied to a driving assist system for a vehicle. The driving assist system for a vehicle is described below with reference to FIGS. 1-6. As shown in FIG. 1, the driving assist system includes a Vehicle-Stability-Control Electronic-Control-Unit (VSC-ECU) 10, a steering angle sensor 20, an acceleration (G) sensor 30, a yaw rate sensor 40, and an Engine Electronic-Control-Unit (ENG-ECU) 50, a radar unit 70, an operational switch (SW) 80, and a vehicle control ECU 100.

The VSC-ECU 10 shown in FIG. 1 controls a brake actuator (not shown) to generate a braking force of a subject vehicle. The VSC-ECU 10 also controls VSC (vehicle stability control, registered trademark) to suppress skidding of the subject vehicle. The VSC-ECU 10 receives information on target speed reduction of the subject vehicle from an in-vehicle Local Area Network (LAN), and controls the brake actuator to slow down the subject vehicle and to provide the target speed reduction. Further, the VSC-ECU 10 transmits information on a speed $V_{s0}$ of the subject vehicle and braking pressure of the subject vehicle to the in-vehicle LAN.

The steering angle sensor 20 detects information on a steering angle of a steering system of the subject vehicle and transmits information on the detected steering angle to the in-vehicle LAN.

The G sensor 30 detects accelerations of the subject vehicle in the lateral and longitudinal directions of the subject vehicle, which are referred to also as lateral and longitudinal accelerations, respectively. The G sensor 30 transmits information on the detected lateral and longitudinal accelerations to the in-vehicle LAN.

The yaw rate sensor 40 detects an angular velocity of the subject vehicle around a vertical axis with respect to the subject vehicle. The angular velocity is also referred to herein as a yaw rate. The yaw rate sensor 40 transmits information on the detected yaw rate to the in-vehicle LAN.

The ENG-ECU 50 receives information on a target acceleration from the in-vehicle LAN, and controls a throttle actuator (not shown) to accelerate the subject vehicle at the target acceleration.

The radar unit 70, for example, irradiates a predetermined area existing forward of the subject vehicle with laser light and receives the reflected laser light. The radar unit 70 thereby can obtain information on an inter-vehicle distance between the subject vehicle and a forward body existing forward of the subject vehicle as well as a relative velocity between the subject vehicle and the forward object. The forward object may be a preceding vehicle existing in a traveling direction of the subject vehicle. The radar unit 70 also can obtain information on a distance (e.g., in a lateral direction) between a central axis of the subject vehicle and a central axis of the preceding vehicle by irradiation of the laser light. The radar unit 70 transmits the obtained information to the vehicle control ECU 100.

The operational SW 80 is a group of switches, which may be operated by, for example, a driver of the subject vehicle. Information on switching the operational SW 80 is output to the vehicle control ECU 100.

The vehicle control ECU 100 is basically provided by a microcomputer and includes a Central Processing Unit (CPU), a Read-Only Memory (ROM), a Random Access Memory (RAM), an Input/Output circuit (I/O), and a bus for connecting elements in the vehicle control ECU 100.

To provide comfortable acceleration feeling to the driver of the subject vehicle in various situations, the vehicle control ECU 100 determines, with using a judgment equation described below, an acceleration control operation start time for a case where the subject vehicle travels while following the preceding vehicle. Also, the vehicle control ECU 100 performs the acceleration control operation to accelerate the subject vehicle at a target acceleration $G_{Dp}$. The acceleration control start time may correspond to a time when the vehicle control ECU 100 starts the acceleration control operation. The target acceleration $G_{Dp}$ is calculated based on a relative velocity between and a target relative velocity corresponding to a threshold $K_{dBct}$ given by the judgment equation.

The judgment equation is derived based on an equation for calculating a correction distance condition evaluation index $K_{dBc}$, which takes into account a velocity of the preceding vehicle and may include information on a distance condition such as an inter-vehicle distance and a relative velocity between the subject vehicle and the preceding vehicle. When a preceding vehicle exists in a traveling direction of a subject vehicle, a driver of the subject vehicle typically judges whether the inter-vehicle distance is increasing or decreasing based on a change of an apparent area of the preceding vehicle on his/her visual image. The driver then adjusts acceleration and deceleration of the subject vehicle by controlling a gas pedal and a brake pedal. Therefore, the change of an apparent area of the preceding vehicle provides a judgment criterion to the driver, and can be a basis for calculating a distance condition evaluation index $K_{dB}$.

An example of calculating the distance condition evaluation index $K_{dB}$ is described below. Here, $H_0$, $W_0$ and $S_0 = H_0 \times W_0$ denote an actual height, an actual width and an actual area of the preceding vehicle, respectively. Also, H, W and S=H×W denote an apparent height, an apparent width and an apparent area of the preceding vehicle projected on retina of the driver. Also, f and D denote a focal distance of eyes of the driver and a distance between the eyes of the driver and the preceding vehicle, respectively. An apparent area S of the preceding vehicle is $$S = WH = W_0 H_0 \left(\frac{f}{D}\right)^2. \qquad \text{eq. (1)}$$

A change of the apparent area S per unit time, corresponding to dS/dt, is calculated as $$\frac{dS}{dt} = \frac{d(WH)}{dt} \propto \frac{d(f/D)^2}{dt} \propto \frac{d(1/D^2)}{dt}. \qquad \text{eq. (2)}$$

With using the derivative of the distance D with respect to time t, the change dS/dt of the apparent area S per unit time is also expressed as the following equation:

$$\frac{dS}{dt} \propto \frac{d(1/D^2)}{dt} = \left\{\frac{d(1/D^2)}{dD}\right\}\frac{dD}{dt} = \left(\frac{-2}{D^3}\right)V_r = K, \qquad \text{eq. (3)}$$

where $V_r$ is the relative velocity between the subject vehicle and the preceding vehicle, and K is a preceding vehicle area change ratio, which also corresponds to the change of the apparent area S of the preceding vehicle with respect to time. As shown in eq. (3), the preceding vehicle area change ratio K is calculated based on: the inter-vehicle distance D between the subject vehicle and the preceding vehicle; and the relative velocity $V_r$=dD/dt, which is the derivative of the inter-vehicle distance D with respect to time t.

Since the preceding vehicle area change ratio K is proportional to the change dS/dt of the apparent area S per unit time, the preceding vehicle area change ratio K is also proportional to a change of a size of the preceding vehicle per unit time on an image captured by an imaging unit or means such as a camera. The preceding vehicle area change ratio K is calculated based on the change of a size of the preceding vehicle on the image per unit time, the image being captured by the imaging means.

When the inter-vehicle distance D changes between 1 m and 100 m, the preceding vehicle area change ratio K accordingly changes up to by 6 orders of magnitude. It may be therefore useful to express the preceding vehicle area change ratio K in a decibel (dB) unit.

To express the K in the dB unit, a value $K_0$ corresponding to 0 [db] is defined. The $K_0$ is assumed to correspond to a case where the relative velocity is $V_r$=−0.1 Km/h and the inter-vehicle distance is D=100 m. The $K_0$ is assumed to correspond to a minimum detectable change of the apparent area of the preceding vehicle for a driver. A positive value of the inter-vehicle velocity is provided when the inter-vehicle distance D is increasing and a negative value of the inter-vehicle velocity is provided when the inter-vehicle distance is decreasing. The $K_0$ is calculated as $$K_0 = \left(\frac{-2}{100^3}\right)\left(\frac{-0.1}{3.6}\right) \cong 5 \times 10^{-8}. \qquad \text{eq. (4)}$$

That is, 0 [dB] is given in a case where the preceding vehicle area change ratio K is $5 \times 10^{-8}$. The distance condition evaluation index $K_{dB}$ is defined in the following equation:

$$K_{dB} = 10 \times \log\left\{\frac{|K|}{5 \times 10^{-8}}\right\} = 10 \times \log\left\{\frac{|-2V_r|}{5 \times 10^{-8} D^3}\right\}. \qquad \text{eq. (5)}$$

A positive value of the distance condition evaluation index $K_{dB}$ is provided when the inter-vehicle distance D is decreasing, and a negative value of the $K_{dB}$ is provided when the inter-vehicle distance is increasing.

Figure 2:
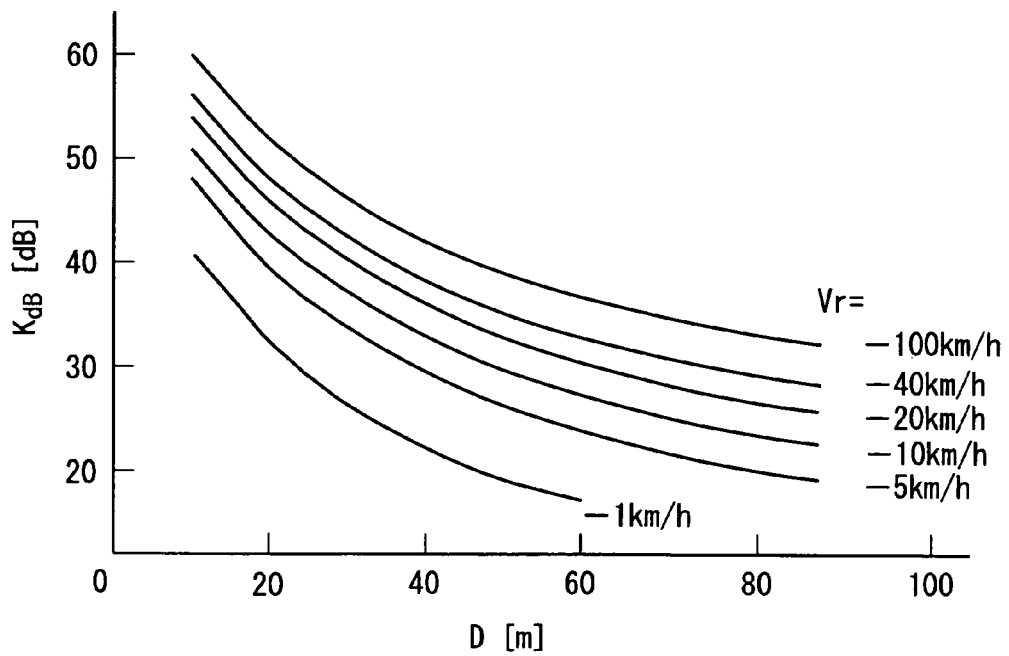
FIG. 2 is a graph showing a relation between a distance condition evaluation index $K_{dB}$, a relative velocity $V_r$, and an inter-vehicle distance D between a subject vehicle and a preceding vehicle.

FIG. 2 shows a graph illustrating the distance condition evaluation index $K_{dB}$ as a function of inter-vehicle distance D and the inter-vehicle velocity $V_r$. As clearly shown in FIG. 2, the distance condition evaluation index $K_{dB}$ becomes larger as the subject vehicle approaches the preceding vehicle at higher relative speed. Also, a slope of the distance condition evaluation index $S_{dB}$ with respect to the inter-vehicle distance D becomes steeper as the inter-vehicle distance D is smaller.

Since the distance condition evaluation index $K_{dB}$ does not take into account the velocity of the preceding vehicle, there would be a case where a determined time for starting acceleration of the subject vehicle does not match a sense of the driver. More specifically, when the following two example cases are compared in a condition that the inter-vehicle velocities between the subject vehicle and the preceding vehicle are approximately equal between the two cases, wherein: one case is a case where the subject vehicle is moving apart from the preceding vehicle by acceleration of the preceding vehicle; and the other case is a case where the subject vehicle is moving apart from the preceding vehicle by deceleration of the subject vehicle, the driver of the subject vehicle according to the other case tends to feel that the acceleration control operation for acceleration the subjected is started later compared to that according to the one case. It may be preferable that the subject vehicle is configured to accelerate earlier in the other case where the driver tends to feel that the acceleration of subject vehicle is started later.

For the above reason, a correction distance condition evaluation index $K_{dBc}$, which further takes into account the velocity $V_b$ of the preceding vehicle, is used. The $K_{dBc}$ is calculated from the following equation:

$$K_{dBc} = 10 \times \log\left\{\left|\frac{-2(|V_r| + \alpha|V_b|)}{5 \times 10^{-8} D^3}\right|\right\}, \qquad \text{eq. (6)}$$

where α is a factor less than or equal to 1 and an optimum value of α is found to be 0.3.

Figure 3:
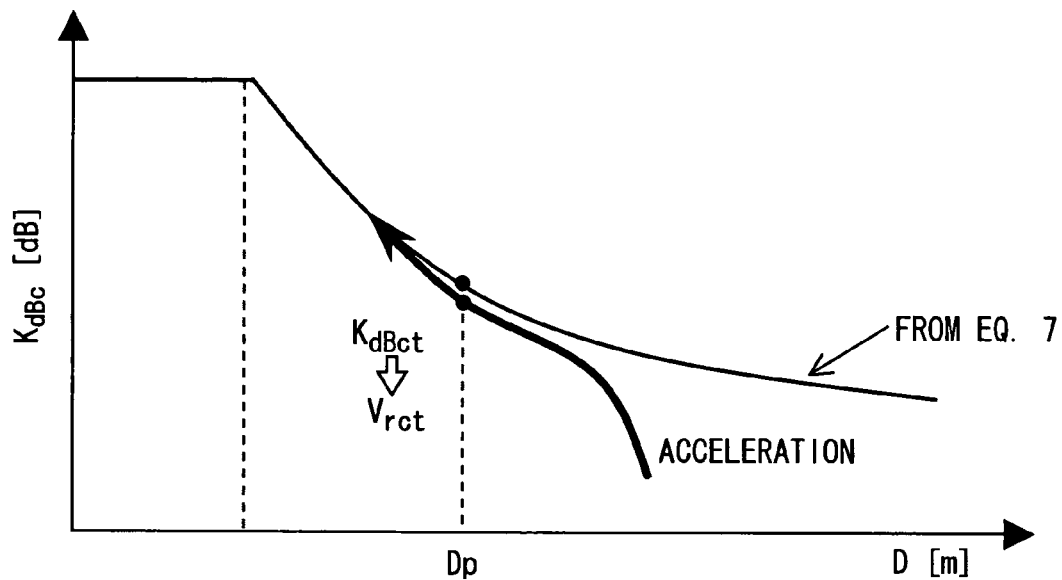
FIG. 3 is a graph of a representative threshold as a function of the inter-vehicle distance D.

Experiments were performed in a condition where a vehicle is approaching a preceding vehicle and a driver of the vehicle is instructed to start a braking operation as late as possible so that the driver can control the vehicle to avoid collision with the preceding vehicle. With using the correction distance condition evaluation index $K_{dBc}$ given by eq. (6), values associated with starting braking operation are found to be approximately distributed around one curve. An approximation expression for describing the curve is given as $$K_{dBct} = -23.76 \times \log D + 76.96, \qquad \text{eq. (7)}$$

where representative characteristics of eq. (7) are shown in FIG. 3. The approximation expression (7) is also referred to herein as the judgment equation. The eq. (7) provides a threshold $K_{dBct}$ of the correction distance condition evaluation index $K_{dBc}$.

With using an approximation expression (7), it is possible to determine a proper time to start the subject vehicle to accelerate and decelerate, which may provide comfortable acceleration feeling to the driver, and thus, the driver may not feel that the acceleration of the subject vehicle is started later.

Figure 4:
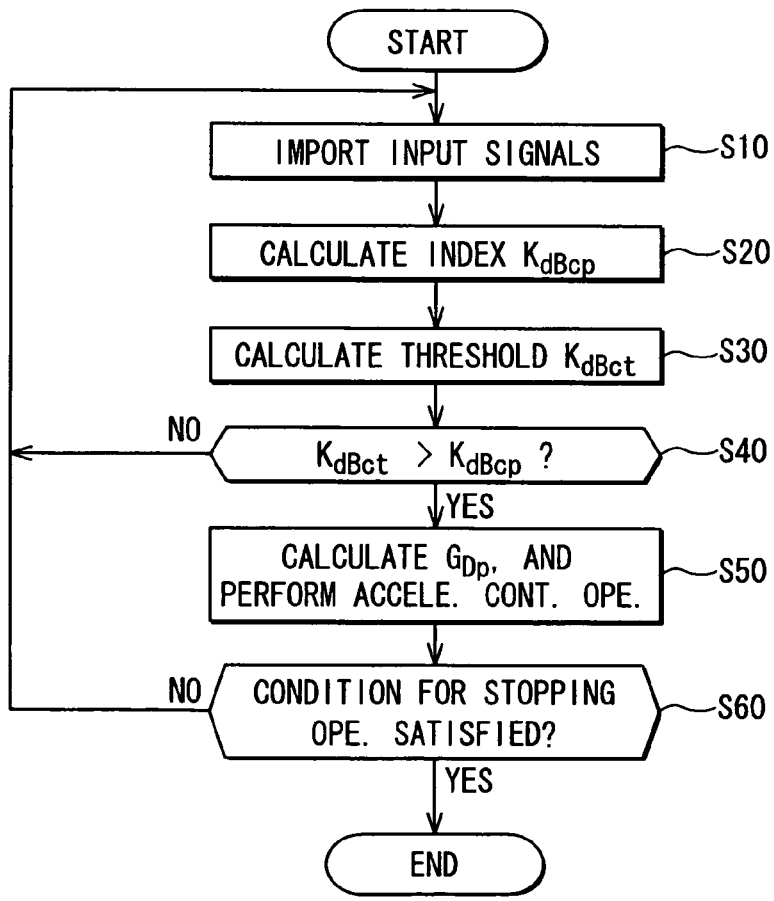
FIG. 4 is a flow chart of an acceleration control operation performed by a vehicle control ECU.

Process associated with the acceleration control operation performed by the vehicle control ECU 100 is explained below with reference to a flow chart shown in FIG. 4. At S10, the vehicle control ECU 100 imports input signals from various sensors. At S20, the vehicle control ECU 100 calculates a correction distance condition evaluation index $K_{dBcp}$ at a present time, which corresponds to a certain value of the correction distance condition evaluation index $K_{dBc}$ and is calculated based on a present condition of the subject vehicle. The present condition for calculation may include a present inter-vehicle distance between the subject vehicle and the preceding vehicle, a present inter-vehicle velocity, and a present velocity of the preceding vehicle. At S30, a threshold $K_{dBct}$ at the present time is calculated by substituting the inter-vehicle distance $D_p$ at the present time in the approximation expression (7).

At S40, the vehicle control ECU 100 determines whether the correction distance condition evaluation index $K_{dBcp}$ is smaller than the threshold $K_{dBct}$. When the correction distance condition evaluation index $K_{dBcp}$ is smaller than the threshold $K_{dBct}$, process proceeds to S50.

At S50, a target acceleration $G_{Dp}$ is calculated with using the following equation:

$$G_{Dp} = \frac{V_{rep} - V_{ret}}{T}, \qquad \text{eq. (8)}$$

where $V_{rcp}$ represents an actual relative velocity between the subject vehicle and the preceding vehicle, $V_{rct}$ is a target relative velocity, and T is a divisor for conversion of a difference between the present relative velocity and the target relative velocity into the target acceleration $G_{Dp}$ and is appropriately set. The target relative-velocity $V_{rct}$ is calculated through procedures involving substitution of the inter-vehicle distance $D=D_p$ in eq. (7) and substitution of the calculated threshold $K_{dBc}=K_{dBct}$ in eq. (6).

At S60, the vehicle control ECU 100 determines whether a condition for stopping the acceleration control operation is satisfied. The condition for stopping the acceleration control operation is, for example, that the subject vehicle is stopped or the correction distance condition evaluation index $K_{dBcp}$ is larger than the corresponding threshold $K_{dBct}$. When it is determined that the condition for stopping the acceleration control operation is not satisfied, process returns to S10.

Figures 5, 6:
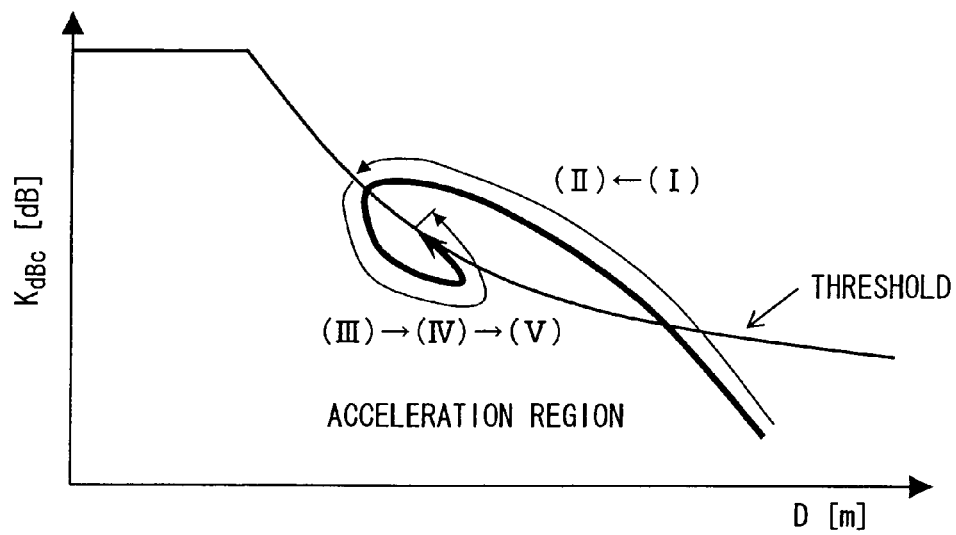
FIG. 5 is a graph of a correction distance condition evaluation index $K_{dBc}$ at a present time in connection with a driving situation where the subject vehicle is accelerated while following the preceding vehicle.
FIG. 6 illustrates example driving situations (I) to (IV) involving the subject vehicle and the preceding vehicle.

FIG. 5 shows variation of the correction distance condition evaluation index $K_{dBcp}$ in a case where the subject vehicle accelerates while following the preceding vehicle. Symbols (I) to (IV) shown in FIG. 5, respectively, correspond to driving situations (I) to (IV) shown in FIG. 6.

The driving situation (I) shown in FIG. 6 represents a case where the subject vehicle travels at a constant speed (e.g., at set vehicle speed 100 km/h) while approaching the preceding vehicle. The driving situation (II) represent a case where the subject vehicle is decelerated to have a speed 80 km/s approximately equal to a speed of the preceding vehicle.

When the driving situation transits from (I) to (II), the correction distance condition evaluation index $K_{dBcp}$ exceeds the corresponding threshold $K_{dBct}$, and the subject vehicle accordingly starts deceleration. The correction distance condition evaluation index $K_{dBcp}$ is going to be convergent on a corresponding threshold $K_{dBct}$ given by the approximation expression of eq. (7) as the judgment equation.

The driving situation (III) shown in FIG. 6 represent a case where the subject vehicle travels at a speed 80 km/h while following the preceding vehicle that travels at 80 km/h. The correction distance condition evaluation index $K_{dBcp}$ corresponding to the driving situation (III) is convergent on a corresponding threshold $K_{dBct}$ given by the approximation expression (7).

The driving situation (IV) shown in FIG. 6 represents a case where the preceding vehicle is accelerated to have a speed 100 km/h while the subject vehicle is following the preceding vehicle. In the above situation, the correction distance condition evaluation index $K_{dBcp}$ corresponding to the driving situation (IV) is smaller than a corresponding threshold $K_{dBct}$ given by the judgment equation, corresponding to an acceleration region shown in FIG. 5. The subject vehicle accordingly starts acceleration to have the speed of the preceding vehicle. Until the subject vehicle has the speed of the preceding vehicle after starting acceleration, the inter-vehicle distance D increases. When the subject vehicle has the speed approximately equal to the subject vehicle, an increase in the inter-vehicle distance D stops.

The driving situation (V) shown in FIG. 6 represents a case where the subject vehicle travels at 100 km/h while following the preceding vehicle traveling at 100 km/h. The correction distance condition evaluation index $K_{dBcp}$ corresponding to the driving situation (V) is convergent on a corresponding threshold $K_{dBct}$ given by the judgment equation, similarly to a case of the driving situation (III).

As explained above, the inter-vehicle distance control apparatus applied to the driving assist system performs the acceleration control operation so that an acceleration of the subject vehicle is adjusted to the target acceleration $G_{Dp}$, which is calculated from the target relative velocity corresponding to the threshold $K_{dBct}$ given by the judgment equation and the relative velocity $V_{rcp}$ at a present time. The acceleration control operation is started when the correction distance condition evaluation index is lower than the corresponding threshold $K_{dBct}$ given by the judgment equation. The correction distance condition evaluation index $K_{dBcp}$ takes into account the velocity of the preceding vehicle existing forward of the subject vehicle. It is therefore possible to provide comfortable acceleration feeling to the driver of the subject vehicle in various situations.

According to the above inter-vehicle distance control apparatus, the radar unit 70 may function as a distance detection means or unit to detect a distance between the subject vehicle and the forward object. Alternatively, the vehicle control ECU 100 may function as the distance detection means or unit which detects a distance between the subject vehicle and the forward object based on the information associated with the distance, the information being obtained by the radar unit 70.

The radar unit 70 may also function as a relative velocity detection means or unit to detect the relative velocity between the subject vehicle and the forward object. Alternatively, the vehicle control ECU 100 may function as the distance detection means or unit which detects the relative velocity between the subject vehicle and the forward object based on the information associated with the relative velocity, the information being obtained by the radar unit 70.

The process S20, at which the correction distance condition evaluation index representing the distance condition between the subject vehicle and the forward object is calculated, may be performed by an evaluation index calculation means or unit. In other words, the vehicle control ECU 100 may function as the evaluation index calculation means or unit.

The process S40, at which a determination is made whether the correction distance condition evaluation index is smaller than the predetermined threshold of the correction distance condition evaluation index, may be performed by an index comparison means or unit. In other words, the vehicle control ECU 100 may function as the index comparison means or unit.

The process S20-S40, at which a determination may be made whether a condition for performing an acceleration control operation is satisfied, may be performed by a condition determination means or unit. In other words, the vehicle control ECU 100 may function as the condition determination means or unit.

The vehicle control ECU 100 may function as an assist control means or unit to perform the acceleration control operation to accelerate the subject vehicle when the index comparison means determines that the correction distance condition evaluation index is smaller than the predetermined threshold of the correction distance condition evaluation index.

The vehicle control ECU 100 may further function as a target value setting means or unit to set the predetermined threshold of the correction distance condition evaluation index as a target value of the correction distance condition evaluation index when the index comparison determines that the correction distance condition evaluation index is smaller than the predetermined threshold of the correction distance condition evaluation index.

The process S50, at which the target acceleration of the subject vehicle is calculated based on the relative velocity and a target relative velocity corresponding to the target value calculated by the target value setting means or unit, may be performed by a target acceleration calculation means or unit. In other words, the vehicle control ECU 100 may function as the target acceleration calculation means or unit.

The assist control unit or means provided by the vehicle control ECU 100 may be configured to perform the acceleration control operation to accelerate the subject vehicle at the target acceleration.

While the invention has been described with reference to preferred embodiment thereof, it is to be understood that the invention is not limited to the preferred embodiment and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An inter-vehicle distance control apparatus comprising:
a distance detection unit configured to detect a distance between a subject vehicle and a forward object existing forward of the subject vehicle;
a relative velocity detection unit configured to detect a relative velocity of the subject vehicle with respect to the forward object;
an evaluation index calculation unit configured to calculate a correction distance condition evaluation index representing a distance condition between the subject vehicle and the forward object,
wherein the correction distance condition evaluation index takes into account a velocity of the forward object,
wherein the correction distance condition evaluation index becomes larger as the velocity of the forward object is larger and as the relative speed of the subject vehicle with respect to the forward object is larger, and
wherein a rate of an increase in the correction distance condition evaluation index with respect to the distance between the subject vehicle and the forward object becomes larger with decreasing distance between the subject vehicle and the forward object;
an index comparison unit configured to determine whether the correction distance condition evaluation index reaches a predetermined threshold of the correction distance condition evaluation index;
an assist control unit configured to perform an acceleration control operation to accelerate the subject vehicle when the index comparison unit determines that the correction distance condition evaluation index reaches the predetermined threshold of the correction distance condition evaluation index;
the correction distance condition evaluation index indicates a degree of change in apparent area of the forward object on a visual image of a driver of the subject vehicle per unit time; and
the predetermined threshold of the correction distance condition evaluation index is a function of only the distance between the subject vehicle and the forward object.

2. The inter-vehicle distance control apparatus according to claim 1, further comprising:
a target value setting unit configured to set the predetermined threshold of the correction distance condition evaluation index as a target value of the correction distance condition evaluation index when the index comparison unit determines that the correction distance condition evaluation index reaches the predetermined threshold of the correction distance condition evaluation index; and
a target acceleration calculation unit configured to calculate a target acceleration of the subject vehicle based on the relative velocity and a target relative wherein
the assist control unit is configured to perform the acceleration control operation to accelerate the subject vehicle at the target acceleration when the index comparison unit determines that the correction distance condition evaluation index reaches the predetermined threshold of the correction distance condition evaluation index.

3. An inter-vehicle distance control apparatus comprising:
a distance detection unit configured to detect a distance between a subject vehicle and a forward object existing forward of the subject vehicle;
a relative velocity detection unit configured to detect a relative velocity of the subject vehicle with respect to the forward object;
a condition determination unit configured to make a determination whether a condition for performing an acceleration control operation is satisfied, by determining whether a correction distance condition evaluation index reaches a predetermined threshold based on the distance between the subject vehicle and the forward object, the relative velocity between the subject vehicle and the forward object, and a velocity of the forward object;
wherein the correction distance condition evaluation index represents a distance condition between the subject vehicle and the forward object, wherein the correction distance condition evaluation index becomes larger as the velocity of the forward object is larger and as the relative speed of the subject vehicle with respect to the forward object is larger, and wherein a rate of an increase in the correction distance condition evaluation index with respect to the distance between the subject vehicle and the forward object becomes larger with decreasing distance between the subject vehicle and the forward object;

an assist control unit configured to perform the acceleration control operation to accelerate the subject vehicle when the condition determination unit determines that the condition for performing the acceleration control operation is satisfied;

the correction distance condition evaluation index indicates a degree of change in apparent area of the forward object on a visual image of a driver of the subject vehicle per unit time; and the predetermined threshold of the correction distance condition evaluation index is a function of only the distance between the subject vehicle and the forward object.

* * * * *